United States Patent Office 3,352,357
Patented Nov. 14, 1967

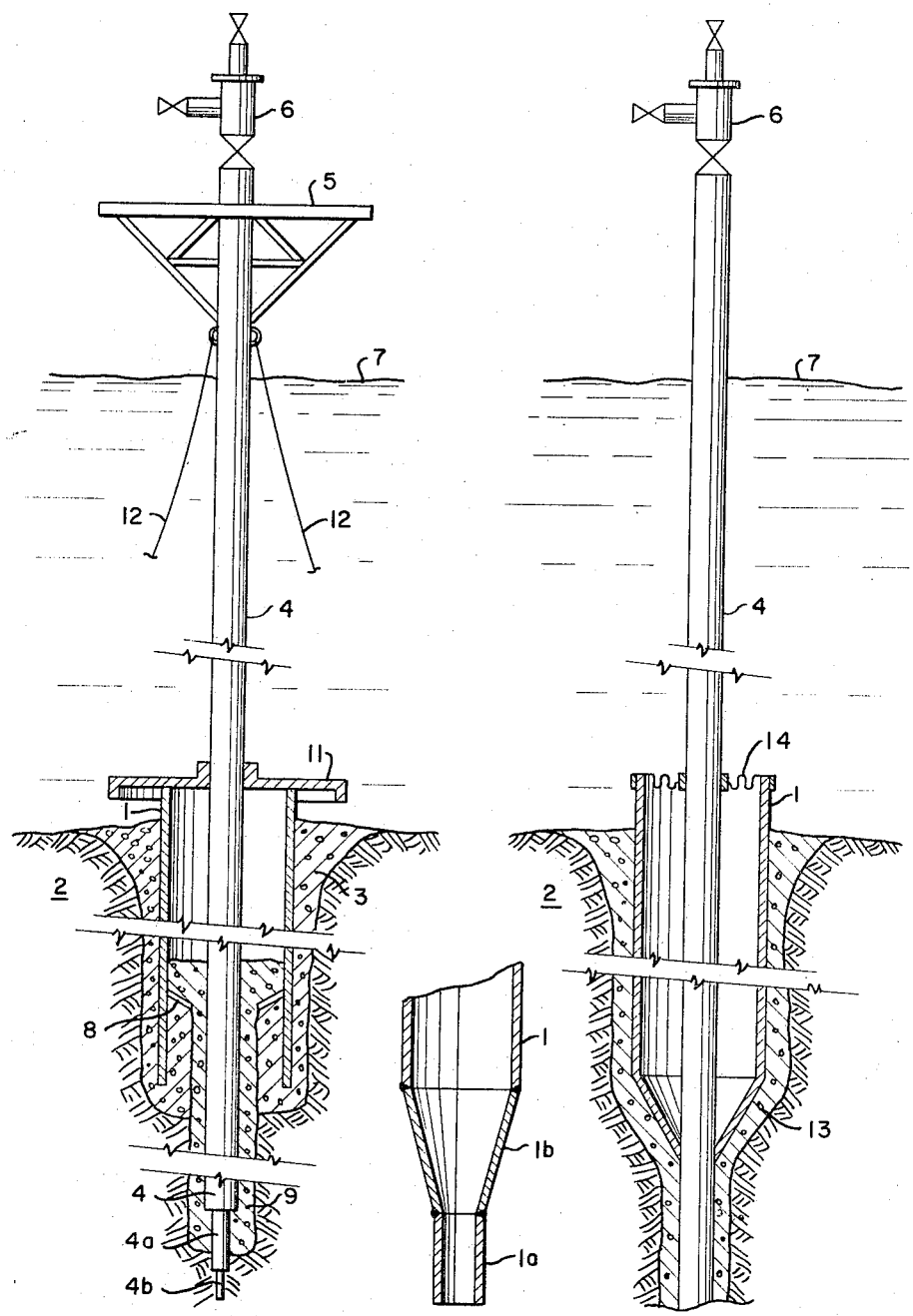

3,352,357
FLEXIBLE MARINE CONDUCTOR WITH
CELLAR PIPE
Wouter H. Van Eek, The Hague, Netherlands, assignor to Shell Oil Company, New York, N.Y., a corporation of Delaware
Filed Oct. 19, 1965, Ser. No. 497,730
Claims priority, application Great Britain,
Nov. 20, 1964, 47,427/64
14 Claims. (Cl. 166—.5)

The present invention relates to a pipe system for an underwater well, and in particular to a conductor pipe which is not supported against lateral movement of the top thereof by a rigid structure such as a well jacket.

In particular, the present invention relates to a conductor pipe located in shallow water, which pipe is either free-standing or guyed with lines running from the upper part thereof to the bottom of the body of water or to mooring buoys arranged around the pipe.

Since such conductor pipes are used when drilling a well in a subsurface formation, or when producing valuable materials from such a subsurface formation, heavy lateral forces are often exerted on the top, or upper part, of the conductor pipe by ships, barges or other floating vessels which are provided with well drilling equipment, production equipment, or well servicing equipment. These vessels, although they are anchored to the bottom of the body of water through which the conductor pipe extends, exert, especially under rough weather conditions, lateral forces to the conductor pipe via the equipment which extends from the ship into the well. If the water in which the conductor pipe is erected is not too shallow, the flexibility of the conductor string is generally sufficiently high to allow for the movements of the floating vessel without creating damaging bending stresses in the portion where the conductor pipe is clamped in the bottom. In shallow waters, however, the length/diameter ratio of the conductor pipe is unfavorable from this point of view which results in high bending stresses in the pipe at the level where it passes into the bottom of the body of water. To minimize the chance of a broken conductor pipe in heavy weather, such pipes have, up till now, been protected by a well jacket of sufficient strength to withstand the forces exerted by the floating vessel. One type of well jacket is shown in U.S. Patent 2,940,265.

The invention is, therefore, concerned with a pipe system for an underwater well located in a formation below a shallow body of water, which pipe system has sufficient flexibility to allow for the movement of a barge or other floating vessel which is anchored near the pipe system and provided with equipment operating within the pipe system, or the well therebeneath. As no fixed structure, such as a well jacket formed by legs and a suitable frame work therebetween is required, the costs, manufacturing costs as well as maintenance costs, of the surface equipment of such a well will be low. If desired, the conductor pipe may either be free-standing or be provided with flexible supporting means, such as guy lines.

According to the invention, a pipe system for an underwater well comprises a conductor pipe extending between a level located above the water level and a level located below the bottom of a body of water, a production casing or pipe string within said conductor pipe and a cellar pipe surrounding the conductor pipe and extending from a level located above the bottom of the body of water but below the water level, to a depth below the bottom of the body of water which is no greater than the depth of the conductor pipe, said cellar pipe being cemented over at least part of its length to the formation underlying the bottom of the body of water.

Preferably, the conductor pipe consists of pipe units which are interconnected by rigid couplings.

The cellar pipe may be connected at or near its lower end to the conductor pipe.

The invention may be carried into practice in various ways but certain specific embodiments will not be described by way of example with reference to the accompanying drawings, in which:

FIGURE 1 is a diagrammatic vertical cross-section of a pipe system according to the present invention;

FIGURE 2 is a diagrammatic vertical cross-section of the lower end of an alternative form of cellar pipe; and FIGURE 3 is a view, similar to FIGURE 1, of another alternative embodiment.

In FIGURE 1, a cellar pipe 1 is cemented to the underwater formation 2 by a cement layer 3, which layer forms a bond between the pipe 1 and the formation 2. A conductor pipe 4 extends through the cellar pipe 1, such that the top thereof, which carries for example the platform 5 and the wellhead 6, is above the water level 7, while the lower end thereof is located within the formation 2 at a suitable depth. It is preferred that the inside diameter of the cellar pipe be at least three times the outside diameter of the conductor pipe forming an annular space which is at least as large as the conductor pipe diameter. Extending down through the pipe 4 is production casing or pipe string 4a. When the well is being produced after drilling, there may also be tubing 4b, in which case the wellhead 6 would be a production wellhead or Christmas tree. The pipe 4 may be centered with respect to the pipe 1 by means of guide members 8 which are arranged within the pipe 1 near the lower end thereof, with an opening therebetween so that the pipe 4 can easily pass therethrough. The members 8 may, for example, be welded to the inner wall of the cellar pipe 1. The lower part of the conductor pipe 4 is cemented to the formation 2 by a cement layer 9.

As can be seen from the drawing, the upper part of the cellar pipe 1 extends to a level above the bottom 10 of the water so as to prevent dirt and cement from entering the top of the pipe. If desired, a closing member, such as a closing cap or lid 11, may be mounted on the pipe 4. If the cap or lid is of a rigid structure, the diameter thereof should be of a sufficient width, such that there is an annular space between the top of the cellar pipe 1 and a downward rim of the cap 11, so as to allow at the upper part of the pipe 1 a free lateral movement of the conductor pipe 4 with respect to the cellar pipe 1.

If desired, the top of the conductor pipe 4 may be supported against lateral movement by guy lines 12, which are at one end thereof connected in a suitable manner to the pipe 4, and at the other end, to the bottom 10 of the water by anchoring means (not shown) suitable for the purpose.

The pipe system comprising the conductor pipe 4 and the cellar pipe 1 is placed in the formation 2 in the following manner.

After a drilling barge (not shown) has been anchored on the location where the well is to be drilled, the cellar pipe 1 is lowered in a vertical position from the barge to the bottom 10. If the bottom 10 of the water way is of an unconsolidated nature, such as loose sand or clay, the pipe 1 is preferably jetted into the bottom 9 by means of water jets. For this purpose, jet nozzles (not shown) are arranged near the lower end of the cellar pipe 1, which nozzles are directed in a substantially downward direction. The water, which is supplied to the nozzles by pumps mounted on the barge, loosens the formation 2, at the same time removing the loosened formation particles, such that the pipe 1 can sink downwardly until the desired depth has been reached. If the formation 2 is of a consolidated nature, a hole of sufficient depth and diameter is drilled so as to contain the cellar pipe 1 in the position as shown in FIGURE 1.

After the pipe 1 is mounted in the desired position, it is cemented to the formation 2 in a known manner, e.g., by pumping cement through a tube which runs from a location above the water level 7 to the lower end of the cellar pipe 1 and is sealed thereto by means of an annular packer member (not shown). The injected cement runs along the outer surface of the cellar pipe 1 to the bottom 10 and, after hardening, forms a layer 3 which forms a bond between the pipe 1 and the formation 2.

After the cementing tube, and eventually the packer, has been removed, the cement plug at the lower end of the cellar pipe 1 is drilled through by a drill bit mounted on a drill string, which bit is run to a desired depth. Thereafter, the bit and the string are removed from the hole, and the conductor pipe 4 is run into the hole thus formed. A cement composition is then injected via the conductor pipe 4 by cement pumps mounted on the drilling barge, which cement flows down to the bottom of the drilled hole, and then upwardly through the annular space around the conductor pipe 4 to the interior of the cellar pipe 1. The amount of cement injected is calculated on the volume around the conductor pipe 4, and is preferably enough to also fill the lower part of the cellar pipe 1 as indicated in FIGURE 1 of the drawing. After hardening, the cement layer 9 forms a bond between the conductor pipe 4 and the formation 2 and, provided that the cement also fills the lower part of the cellar pipe 1, there is also formed a rigid connection between the pipes 1 and 4. This latter connection, however, does not form an essential feature of the invention.

Since the length of the conductor pipe 4 always will exceed the length of a normal pipe unit, the conductor pipe 4 is preferably formed by several pipe units which are coupled together by means of rigid couplings of any suitable type, such as screw couplings or welds. These couplings are not shown in detail as they are known per se. The units are coupled together in a known manner during the lowering of the conductor 4 into the hole.

The centering members 8 will be useful in guiding the drill and drill string, and later on the conductor 4, to the center of the cellar pipe 1, thus enabling the maximum deflection of the conductor 4 with respect to the cellar pipe 1 in all directions.

These members may be omitted if use is made of a cellar pipe which has the lower part thereof formed as indicated in FIGURE 2. Here a short pipe $1_a$ is connected via the frusto-conical part $1_b$ to the lower end of the cellar pipe 1. The inner diameter of the pipe $1_a$ is greater than the outer diameter of the conductor pipe 4 and also greater than the outer diameter of the drill bit (not shown) which is used for drilling the hole in which the conductor pipe 4 is to be lowered. By placing in the pipe $1_a$ the packer member through which the cementing tube used in the formation of the cement layer 3 extends, the frusto-conical part $1_b$ will be kept free from cement and thus can perform its centering function of guiding the drill bit and the conductor pipe 4 to the center of the cellar pipe 1.

After the conductor pipe 4 has been set in the manner described, the well is drilled in a conventional manner via the top opening of the conductor pipe 4 by means of equipment arranged on the drilling barge. After the well has been completed (of which completion only a wellhead 6 has been shown in the drawing), there may be arranged guy lines 12 for flexibly anchoring the top of the conductor pipe 4 to the bottom 10. The guy lines 12, however, do not form an essential feature of the invention. A platform 5 may be arranged on the top of the conductor pipe 4, if desirable.

It will be clear that the mounting of the cellar pipe 1 and the conductor pipe 4, as well as the subsequent drilling and completion of the well may also be performed from a platform which is supported by legs on the bottom 10. Since, after completion of the well, the platform is removed and servicing of the well is to be carried out from a floating vessel, the flexibility of the conductor pipe will prevent this string from buckling or breaking if during such service work the floating vessel is in contact with the conductor pipe under rough weather conditions.

An alternative arrangement of the pipe system is shown in FIGURE 3. Here a pipe combination comprising a conductor pipe 4 and a cellar pipe 1 connected thereto, has been placed in the formation 2. To ensure an easy handling of this combination, the pipe 1 and at least that part of pipe 4 enclosed by pipe 1 may be formed as a single structure, while the remaining part of the pipe 4 consists of pipe units which can be coupled by means of rigid coupling members, such as screw threads. The lower end of the conductor pipe 4 is jetted into the formation 2, which part is followed by the cellar pipe 1. Additional pipe units are mounted on the top of the pipe 4 until the pipe combination has reached the desired position, wherein the top of the cellar pipe 1 is above the bottom 10. Thereafter, a cement composition is pumped via the interior of the pipe 4 or a cementing tube arranged therein, to the space around the pipes 1 and 4, thereby forming a cement layer 13 which after hardening bonds the pipe combination to the formation 2. The well is drilled and completed via the top of the conductor pipe 4 which is above the water level 7.

To prevent the annular space between the conductor pipe 4 and the cellar pipe 1 from becoming filled with undesirable matter, such as sand, dirt and cement, which would prevent lateral movements of the pipe 4 within the upper part of the pipe 1, the upper end of the cellar pipe 1 is arranged at a suitable distance above the bottom 10. If desired, the upper end of the annular space may be covered by a lid or cap 11 (as indicated schematically in FIGURE 1), or closed by a flexible membrane 14 (FIGURE 3), which members will prevent undesirable matter from entering the annular space, but not limit the lateral movement of the pipe 4 within the pipe 1.

By way of example, it is indicated herein that for a given barge which has at a certain anchorage a deflection of 5% at a water depth of 100 ft. the length of a conductor pipe having an outer diameter of 40" and a wall thickness of 2" should be at least 190 ft. to keep the stresses raised therein within a safe limit. This results in the application of a cellar pipe which has a length of at least 50 ft. measured between the top of the cement plug (FIGURE 1) and the bottom of the waterway. It is desirable to allow for minimum deflection of at least about 3%.

I claim as my invention:

1. A pipe system for an underwater well comprising a conductor pipe extending between a level located above the water level and a depth located below the bottom of a body of water, a pipe string within said conductor pipe and a cellar pipe surrounding the conductor pipe to form an annular space between said pipes and extending from a level located above the bottom of the body of water but below the water level to a depth below the bottom of the body of water which is no greater than the depth of the conductor pipe, said cellar pipe being cemented over at least part of its length to the formation underlying the bottom of the body of water.

2. A pipe system as claimed in claim 1 wherein the conductor pipe consists of pipe units which are interconnected end-to-end by rigid couplings.

3. In combination with a pipe system as claimed in claim 1, wellhead equipment arranged on the top of the conductor pipe.

4. A pipe system as claimed in claim 1 wherein the conductor pipe is cemented to the formation part underlying the lower end of the cellar pipe.

5. A pipe system as claimed in claim 1 wherein the cellar pipe is connected near its lower end to the conductor pipe.

6. A pipe system as claimed in claim 5, wherein the connection between the two pipes is formed by a mass of hardened cement which is arranged in the space between the two pipes, and extends over only part of the length of the cellar pipe near the lower end thereof.

7. In combination with a pipe system as claimed in claim 1, a cover member near the top of the cellar pipe to close the annular space existing between the conductor pipe and the cellar pipe, which member forms a laterally-movable closure between the two pipes.

8. A pipe system as claimed in claim 7, wherein the cover member consists of a flexible membrane.

9. A pipe system for an underwater production well comprising a conductor pipe made of a plurality of pipe units interconnected by rigid couplings which extend from a level located above the water surface to a depth below the bottom of a body of water, production casing within said conductor pipe, and a cellar pipe surrounding the conductor pipe to form an annular space between said pipes and extending from a level between the surface of the water and the bottom to a depth below the bottom of the body of water which is no greater than the depth of the conductor pipe, said cellar pipe being cemented over at least part of its length to the formation underlying the bottom of the body of water.

10. In combination with the pipe system as defined in claim 9, a string of production tubing within the production casing.

11. In combination with a pipe system as defined in claim 9, a cover member at the top of the cellar pipe to close the annular space existing between the conductor pipe and the cellar pipe, which member does not form a rigid connection between the two pipes.

12. In combination with a pipe system as defined in claim 9, guide members positioned within the cellar pipe near the lower end thereof and fixed thereto which serve as guides for centering the conductor pipe within the cellar pipe.

13. A pipe system as defined in claim 9 wherein the lower end of the cellar pipe is formed by a conduit of reduced diameter which serves to center the conductor pipe within the cellar pipe.

14. A pipe system as defined in claim 9 wherein the lower end of the cellar pipe is fixed to the conductor pipe forming a single unit.

References Cited

UNITED STATES PATENTS

| 2,607,422 | 8/1952 | Parks et al. | 166—.5 |
| 2,940,265 | 6/1960 | Doody et al. | 61—46 |
| 2,988,144 | 6/1961 | Conrad | 175—7 |
| 3,163,238 | 12/1964 | Malott | 175—7 |
| 3,168,142 | 2/1965 | Watkins et al. | 166—.6 |
| 3,196,958 | 7/1965 | Travers et al. | 166—.5 X |
| 3,279,536 | 10/1966 | Wakefield | 166—.5 |

CHARLES E. O'CONNELL, *Primary Examiner.*

R. E. FAVREAU, *Assistant Examiner.*